United States Patent
Afzelius et al.

(10) Patent No.: US 11,412,019 B2
(45) Date of Patent: *Aug. 9, 2022

(54) SYSTEM AND METHOD FOR MODIFYING A STREAMING MEDIA SERVICE FOR A MOBILE RADIO DEVICE

(71) Applicant: SPOTIFY AB, Stockholm (SE)

(72) Inventors: Jens Afzelius, Stockholm (SE); Lingyu Wang, Nacka (SE); Michael Becker, New York City, NY (US); Shannon Cusick, New York City, NY (US); Nikoloas Toumpelis, Stockholm (SE); Nicholas Konstantinidis, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,700

(22) Filed: Apr. 27, 2020

(65) Prior Publication Data

US 2021/0084090 A1    Mar. 18, 2021

Related U.S. Application Data

(63) Continuation of application No. 14/971,814, filed on Dec. 16, 2015, now Pat. No. 10,666,700.

(30) Foreign Application Priority Data

Dec. 18, 2014   (EP) ..................................... 14198955

(51) Int. Cl.
*H04L 29/06*      (2006.01)
*H04L 65/60*      (2022.01)
(Continued)

(52) U.S. Cl.
CPC ....... *H04L 65/601* (2013.01); *G06Q 30/0259* (2013.01); *G06Q 30/0261* (2013.01);
(Continued)

(58) Field of Classification Search
CPC ... H04L 65/601; H04L 65/4069; H04L 67/18; H04L 67/20; H04W 4/80; H04W 4/021;
(Continued)

(56) References Cited

U.S. PATENT DOCUMENTS

| 2011/0060652 | A1* | 3/2011 | Morton | G06Q 20/3224 |
| | | | | 705/14.58 |
| 2013/0031216 | A1* | 1/2013 | Willis | G06Q 50/01 |
| | | | | 709/219 |

(Continued)

OTHER PUBLICATIONS

Afzelius, Office Action, U.S. Appl. No. 14/971,814, dated Sep. 12, 2017, 10 pgs.

(Continued)

*Primary Examiner* — Sibte H Bukhari
(74) *Attorney, Agent, or Firm* — Morgan, Lewis & Bockius LLP

(57) ABSTRACT

The present disclosure relates to a method performed in a network server of a service provider providing a service comprising media streaming. The method comprises receiving a detection message from a mobile radio device running the service for a user registered with the service provider, said message comprising an indication that said radio device has detected a radio transmitter as well as comprising an identifier of said radio transmitter. The method also comprises determining that the radio transmitter, as identified by the received identifier, is registered with the service provider and associated with one or more actions. The method also comprises electing an action of the one or more actions. The method also comprises sending an instructions message to (Continued)

the radio device, said message comprising instructions to modify the service such that the radio device performs the elected action.

16 Claims, 2 Drawing Sheets

(51) Int. Cl.
| | | |
|---|---|---|
| *H04W 4/21* | (2018.01) | |
| *H04W 4/80* | (2018.01) | |
| *G06Q 30/02* | (2012.01) | |
| *H04L 67/52* | (2022.01) | |
| *H04W 4/021* | (2018.01) | |
| *H04W 4/18* | (2009.01) | |
| *H04W 64/00* | (2009.01) | |
| *H04L 67/53* | (2022.01) | |
| *H04L 65/61* | (2022.01) | |

(52) U.S. Cl.
CPC ......... *G06Q 30/0267* (2013.01); *H04L 67/18* (2013.01); *H04W 4/021* (2013.01); *H04W 4/18* (2013.01); *H04W 4/21* (2018.02); *H04W 4/80* (2018.02); *H04W 64/00* (2013.01); *H04L 65/4069* (2013.01); *H04L 67/20* (2013.01)

(58) Field of Classification Search
CPC .... H04W 4/18; H04W 64/00; G06Q 30/0259; G06Q 30/0261; G06Q 30/0267
USPC ........................................................ 709/219
See application file for complete search history.

(56) References Cited

U.S. PATENT DOCUMENTS

| | | | |
|---|---|---|---|
| 2014/0006161 A1* | 1/2014 | Jabara ................ | G06Q 30/0261 705/14.57 |
| 2014/0113560 A1 | 4/2014 | Graube et al. | |
| 2014/0358685 A1 | 12/2014 | Want et al. | |
| 2015/0319479 A1 | 11/2015 | Mishra et al. | |

OTHER PUBLICATIONS

Afzelius, Final Office Action, U.S. Appl. No. 14/971,814, dated Jul. 27, 2018, 11 pgs.

Afzelius, Office Action, U.S. Appl. No. 14/971,814, dated Mar. 22, 2019, 12 pgs.

Afzelius, Notice of Allowance. U.S. Appl. No. 14/971,814, dated Jan. 17, 2020, 16 pgs.

European Patent Office, International Searching Authority, Extended European Search Report for European Patent Application No. 14198955.8 dated Jun. 18, 2015, 9 pgs.

European Search Report issued by European Patent Office for European Patent Application No. 17185177.7, dated Oct. 19, 2017, 4 pgs.

Communication pursuant to Article 94(3) issued by European Patent Office for European Patent Application No. 17185177.7, dated Nov. 8, 2017, 11 pgs.

Communication pursuant to Article 94(3) issued by European Patent Office for European Patent Application No. 17185177.7, dated May 18, 2018, 11 pgs.

Decision to Grant issued by European Patent Office for European Patent Application No. 14198955.8, dated Aug. 24, 2017, 2 pgs.

* cited by examiner

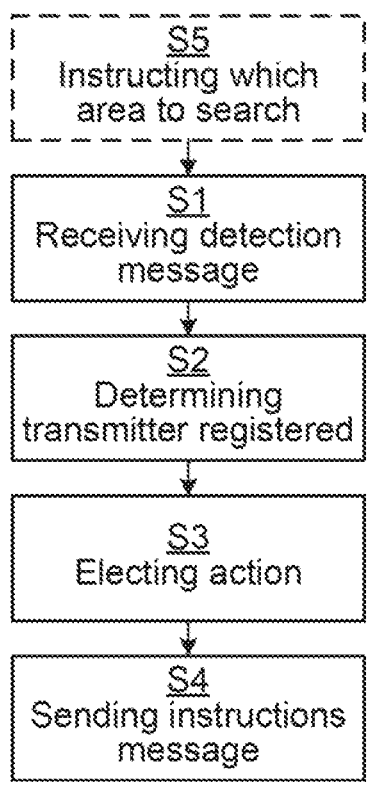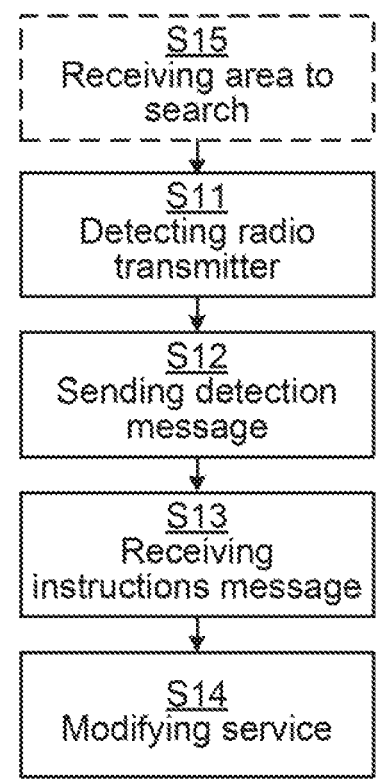
Fig. 5
Fig. 6

SYSTEM AND METHOD FOR MODIFYING A STREAMING MEDIA SERVICE FOR A MOBILE RADIO DEVICE

CLAIM OF PRIORITY

This application is a continuation of U.S. Patent Application tiled "SYSTEM AND METHOD FOR MODIFYING A STREAMING MEDIA SERVICE FOR A MOBILE RADIO DEVICE", application Ser. No. 14/971,814, filed Dec. 16, 2015; which claims the benefit of priority under 35 U.S.C. 119 to European Patent Application No. EP14198955.8, titled "MODIFYING A STREAMING MEDIA SERVICE FOR A MOBILE RADIO DEVICE", Inventor Jens Afzelius, filed Dec. 18, 2014; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to methods and devices for modifying a streaming media service for a mobile radio device.

BACKGROUND

Radio terminals such as smartphones have data connectivity via Wi-Fi and cellular radio networks and may thus obtain services from service providers over the Internet. For instance, services may provide streaming media such as music or movies. Such services may be at least partly financed by bought advertisement. Such advertisement may be country specific, e.g. as identified via the IP address of the terminal, but it may be desirable to further tailor the advertisement based on the location of the terminal.

SUMMARY

It is an objective of the present invention to provide a method for improving how to modify a streaming media service to a radio device based on the location of the radio device, e.g. to provide location based information to a user of the service provided by the service provider.

In accordance with the present disclosure, this is achieved by having a radio transmitter which is registered with the service provider and having the radio device running the service report to the service provider when it detects said radio transmitter. The service provider may then conclude that the radio device is in proximity of the radio transmitter and may act accordingly to e.g. provide the location based information, e.g. advertisement.

Aspects of the present invention are defined below.

According to an aspect of the present disclosure, there is provided a method performed in a network server of a service provider providing a service comprising media streaming. The method comprises receiving a detection message from a mobile radio device running the service for a user registered with the service provider, said message comprising an indication that said radio device has detected a radio transmitter as well as comprising an identifier of said radio transmitter. The method also comprises determining that the radio transmitter, as identified by the received identifier, is registered with the service provider and associated with one or more actions. The method also comprises electing an action of the one or more actions. The method also comprises sending an instructions message to the radio device, said message comprising instructions to modify the service such that the radio device performs the elected action. The disclosure also relates to a method performed by a mobile radio device, as well as to a network server and to a radio device.

According to another aspect of the present disclosure, there is provided a method performed in a mobile radio device running a service comprising media streaming provided by a service provider. The method comprises detecting a radio transmitter, comprising obtaining an identifier of said radio transmitter. The method also comprises automatically sending a detection message over a radio interface to a network server of the service provider, said message comprising an indication that the radio device has detected the radio transmitter as well as comprising the identifier of said radio transmitter. The method also comprises receiving an instructions message from the network server, said message comprising instructions to modify the service to perform an action elected by the server. The method also comprises modifying the service in accordance with the received instructions such that the radio device performs the elected action.

According to another aspect of the present disclosure, there is provided a computer program product comprising computer-executable components for causing a processing device, e.g. a radio device or a network server as discussed herein, to perform an embodiment of a method of the present disclosure when the computer-executable components are run on processor circuitry comprised in the processing device.

According to another aspect of the present disclosure, there is provided a network server for a service provider providing a service comprising media streaming. The server comprises processor circuitry, and a storage unit storing instructions executable by said processor circuitry whereby said server is operative to receive a detection message from a mobile radio device running the service, said message comprising an indication that said radio device has detected a radio transmitter as well as comprising an identifier of said radio transmitter. The server is also operative to determine that the radio transmitter, as identified by the received identifier, is registered with the service provider and associated with one or more actions. The server is also operative to elect an action of the one or more actions. The server is also operative to send an instructions message to the radio device, said message comprising instructions to modify the service such that the radio device performs the elected action.

According to another aspect of the present disclosure, there is provided a mobile radio device configured for running a service comprising media streaming provided by a service provider. The radio device comprises processor circuitry, and a storage unit storing instructions executable by said processor circuitry whereby said radio device is operative to detect a radio transmitter, comprising obtaining an identifier of said radio transmitter. The radio device is also operative to automatically send a detection message over a radio interface to a network server of the service provider, said message comprising an indication that the radio device has detected the radio transmitter as well as comprising the identifier of said radio transmitter. The radio device is also operative to receive an instructions message from the network server, said message comprising instructions to modify the service to perform an action elected by the server. The radio device is also operative to modify the service in accordance with the received instructions such that the radio device performs the elected action.

According to another aspect of the present disclosure, there is provided a computer program for a network server of a service provider providing a service comprising media streaming, the computer program comprising computer program code which is able to, when run on processor circuitry of the server, cause the server to receive a detection message from a mobile radio device running the service, said message comprising an indication that said radio device has detected a radio transmitter as well as comprising an identifier of said radio transmitter. The code is also able to cause the server to determine that the radio transmitter, as identified by the received identifier, is registered with the service provider and associated with one or more actions. The code is also able to cause the server to elect an action of the one or more actions. The code is also able to cause the server to send an instructions message to the radio device, said message comprising instructions to modify the service such that the radio device performs the elected action.

According to another aspect of the present disclosure, there is provided an application software for enabling a mobile radio device to run a service comprising media streaming provided by a service provider, the application software comprising computer program code which is able to, when run on processor circuitry of the radio device, cause the radio device to obtain an identifier of a radio transmitter detected by the radio device. The code is also able to cause the radio device to automatically send a detection message over a radio interface to a network server of the service provider, said message comprising an indication that the radio device has detected the radio transmitter as well as comprising the identifier of said radio transmitter. The code is also able to cause the radio device to modify the service in accordance with instructions received in an instructions message from the network server, said message comprising instructions to perform an action elected by the server, such that the radio device performs the elected action.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 5 is a schematic flow chart of embodiments of a method performed in a network server in accordance with the present invention.

FIG. 6 is a schematic flow chart of embodiments of a method performed in a mobile radio device in accordance with the present invention.

DETAILED DESCRIPTION

Embodiments will now be described more fully hereinafter with reference to the accompanying drawings, in which certain embodiments are shown.

However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
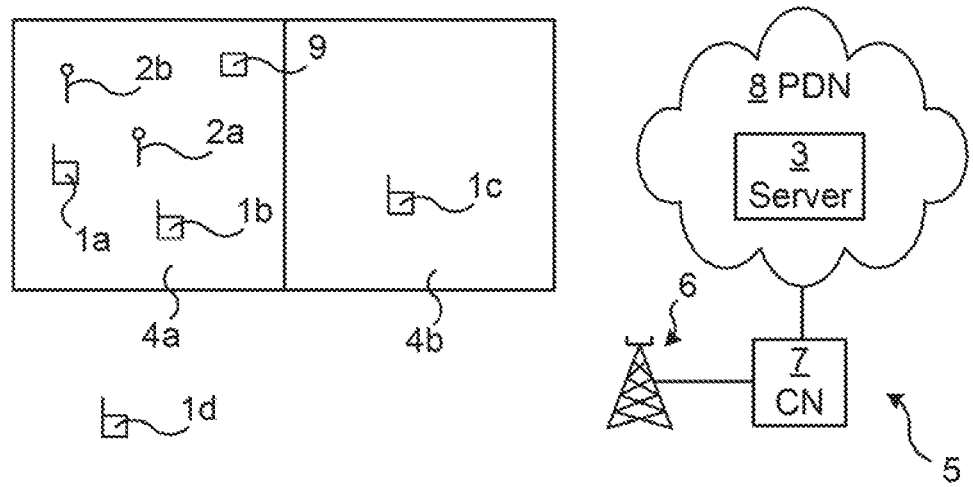
FIG. 1 is a schematic block diagram of a communication system in accordance with embodiments of the present invention.

FIG. 1 illustrates some example embodiments of the present invention. A plurality of mobile radio devices 1 are running application software, i.e. an app, for streaming media provided by/via a service provider which in the figure is represented by the network server 3 but may also have many further servers. In FIG. 1, four radio devices 1 are shown (1a, 1b, 1c and 1d) as an example for illustrating the present invention. A radio transmitter 2 (in the example of the figure there are two radio transmitters 2a and 2b shown) is located in an area 4a, e.g. a store in a shopping mall or on a street. A neighbouring area/store 4b is also shown. The store 4a may also have a media playing device 9 running application software for streaming media e.g. for playing in-store music through speakers comprised in the media playing device 9. Such a device 9 may be a mobile or stationary device, and a wired or wireless device, e.g. a mobile radio device or a stationary wired device such as a computer with Ethernet access. The media playing device 9 may use the same network server 3 or service as the radio device(s) 1. A large store 4 may have multiple media playing devices 9 in different departments.

The mobile radio device 1 may be any devices able to communicate over a radio interface, typical examples include a smartphone or a tablet, or any other mobile media player. The radio device 1 may use any radio communication standard to connect to the server 3 of the service provider, e.g. a wireless local area network (WLAN) or a cellular network, typically in accordance with a Third Generation Partnership Project (3GPP) standard. In the figure, the radio devices 1 have connectivity via a cellular radio communication network 5 comprising a radio access network (RAN) 6 and a core network (CN) 7 which provides access to a packet data network (PDN) 8 e.g. the Internet via which the network server 3 is accessible.

The owner of the store 4a may want users of a radio device 1 running the service (e.g. by means of the app) to receive an advertisement for, or other information related to, the store when the radio device 1 is in proximity to the store 4a. The owner may then buy such an advertisement from the service provider and a radio transmitter 2 is located in a suitable place in the store 4a and registered with the service provider, e.g. in the network server 3 or a registration server of the service provider. The radio transmitter 2 may be any type of radio transmitter but it may be convenient to use a radio transmitter which transmits in accordance with the Bluetooth Low Energy (BLE) standard whereby the radio transmitter may act as a BLE beacon. The range of such a transmitter may be controlled as desired by setting the transmission power. Thus, the radio transmitter 2 is registered with the service provider and associated with one or more actions to be performed if a radio device 1 running the service of the service provider (typically by means of the app mentioned herein) gets within range of the transmitter 2. Such a transmitter may also be associated with a media playing device 9. The action may e.g. be to modify the media streaming to the radio device 1 of the service to include an advertisement e.g. information about products or special offers in the store 4a, or provide a suitable playlist for the user to listen to while in the store. In an embodiment, such a suitable playlist may be the playlist that is being played by the in-store media playing device 9 and the media stream to the mobile radio device 1 may then be synchronized to match the media stream to the media playing device 9. The action may be compulsory/pushed on the radio device 1, e.g. in a free version of the service, or it may only be a suggestion to the user of the radio device, e.g. in a premium version of the service.

The transmitter 2 may be associated with a plurality of actions which the service provider may elect between. The electing may e.g. be based on any of: the location of the radio device 1, e.g. as determined by means of a positioning functionality in the radio device (for instance a Global Positioning System (GPS) function) or by means of the reception power of the radio transmissions from the radio transmitter 2 (indicating the distance to the radio transmitter), the location of the radio transmitter 2, which may be registered (typically as geographical coordinates) together with the radio transmitter in a server 3 of the service provider or obtained from a positioning functionality (e.g. GPS) of the radio transmitter, the distance between the radio device and the radio transmitter, e.g. as determined by means of the reception power of the radio transmissions from the radio transmitter 2, the currently playing media stream for a media playing device 9, the time of day or day of week, and/or gender, age, habits in using the service and/or payment history of the registered user (which may be known by the service provider from the registration of the user and any payments made for the service by the user).

Thus actions (e.g. information/advertisement) tailored for the user may be provided by the service provider and executed by the radio device 1.

The radio transmitter 2 and/or the media playing device 9 (if used) may be owned/controlled either by the store owner (customer) or by the service provider.

As illustrated in FIG. 1, more than one radio transmitter 2 may be used in the store 4a. Thus, an improved positioning of the radio device 1 may be achieved through triangulation, whereby the action may more easily be elected based on e.g. where in the store, or outside the store, the radio device is currently located. Alternatively, the different radio transmitters 2 may have different ranges, e.g. such that the radio transmitter 2a has a longer range and induces one set of actions in radio devices outside the store 4a, e.g. in the neighbouring store 4b, and the radio transmitter 2b has a shorter range and induces another set of actions e.g. information about that department of the store.

Thus, the four different radio devices 1 shown in FIG. 1 may all perform actions elected by the service provider due to their detection of the radio transmitter 2a and/or 2b, but the action elected may be different for the different devices 1 in view of their different locations and/or the different service users having the different devices. For instance, radio device 1a which is close to the second radio transmitter 2b may perform the action of providing (e.g. playing or displaying) information to the user about that department of the store 4a, the radio device 1b which is in another part of the store 4a may perform the action of providing general information about the store, the radio device 1c which is in the neighbouring store 4b may perform the action of providing information intended to make the user want to visit also the store 4a with the radio transmitter(s) 2, while the radio device 1d which is not in any store may perform the action of providing information to make the user interested in shopping.

Each of the radio devices 1 running the service may be generally instructed by the service provider, e.g. via the app, to report any radio transmitters 2 it detects, e.g. any BLE transmitters, whereby the service provider may check whether the radio transmitter is one that is registered with the service provider or not. Alternatively, the service provider may instruct the radio device 1 to only search for radio transmitters in areas where the service provider knows there is a registered transmitter 2, thereby conserving power of the radio device.

Figure 2:
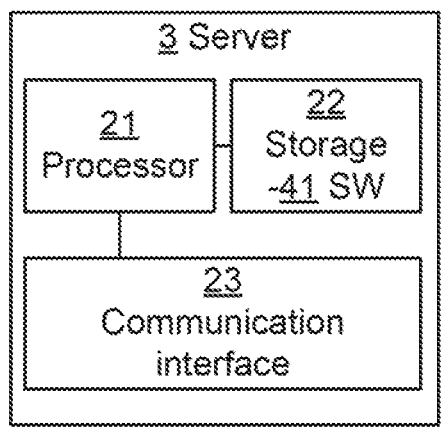
FIG. 2 is a schematic block diagram of an embodiment of a network server in accordance with the present invention.

FIG. 2 schematically illustrates an embodiment of a network server 3 of the service provider of the present disclosure. The server 3 comprises processor circuitry 21 e.g. a central processing unit (CPU). The processor circuitry 21 may comprise one or a plurality of processing units in the form of microprocessor(s). However, other suitable devices with computing capabilities could be comprised in the processor circuitry 21, e.g. an application specific integrated circuit (ASIC), a field programmable gate array (FPGA) or a complex programmable logic device (CPLD). The processor circuitry 21 is configured to run one or several computer program(s) or software (SW) 41 (see also FIG. 4) stored in a storage 22 of one or several storage unit(s) e.g. a memory. The storage unit is regarded as a computer readable means 42 (see FIG. 4) as discussed herein and may e.g. be in the form of a Random Access Memory (RAM), a Flash memory or other solid state memory, or a hard disk, or be a combination thereof. The processor circuitry 21 may also be configured to store data in the storage 22, as needed. The server 3 also comprises a communication interface 23 for communicating with other nodes via the communication network, e.g. with a radio device 1 as discussed herein or with other servers of the service provider.

Figure 3:
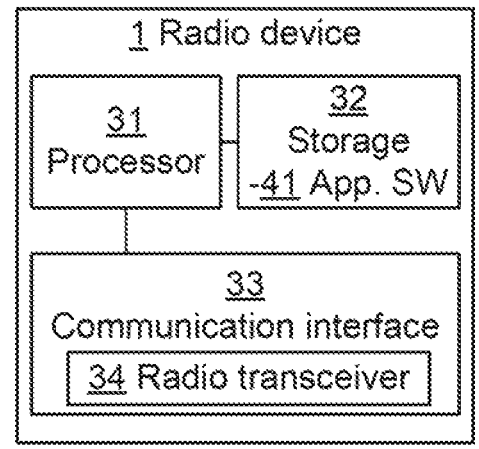
FIG. 3 is a schematic block diagram of an embodiment of a mobile radio device in accordance with the present invention.

FIG. 3 schematically illustrates an embodiment of a mobile radio device 1 of the present disclosure. The radio device 1 comprises processor circuitry 31 e.g. a central processing unit (CPU). The processor circuitry 31 may comprise one or a plurality of processing units in the form of microprocessor(s). However, other suitable devices with computing capabilities could be comprised in the processor circuitry 31, e.g. an application specific integrated circuit (ASIC), a field programmable gate array (FPGA) or a complex programmable logic device (CPLD). The processor circuitry 31 is configured to run one or several computer program(s) or software (SW) 41 (see also FIG. 4), e.g. an application software (app), stored in a storage 32 of one or several storage unit(s) e.g. a memory. The storage unit is regarded as a computer readable means 42 (see FIG. 4) as discussed herein and may e.g. be in the form of a Random Access Memory (RAM), a Flash memory or other solid state memory, or a hard disk, or be a combination thereof. The processor circuitry 31 may also be configured to store data in the storage 32, as needed. The radio device 1 also comprises a communication interface 33 having a radio transceiver 34 for radio communication with other nodes via the communication network, e.g. with a network server 3 of the service provider via a RAN 6.

Figure 4:
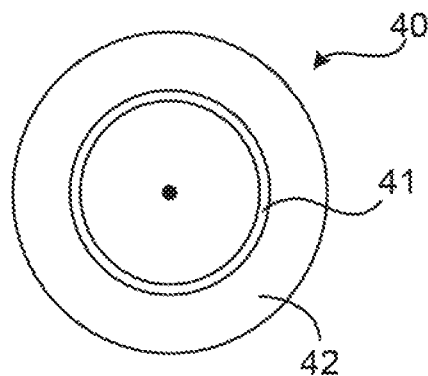
FIG. 4 is a schematic illustration of an embodiment of a computer program product in accordance with the present invention.

FIG. 4 illustrates a computer program product 40. The computer program product 40 comprises a computer readable (non-volatile) medium 42 comprising a computer program 41 in the form of computer-executable components 41. The computer program/computer-executable components 41 may be configured to cause a radio device 1 or network server 3, e.g. as discussed herein, to perform an embodiment of a method of the present disclosure. The computer program/computer-executable components may be run on the processor circuitry 21/31 of the device/server for causing the device/server to perform the method. The computer program product 40 may e.g. be comprised in a storage unit or memory 22/32 comprised in the device 1 or server 3 and associated with the processor circuitry 21/31. Alternatively, the computer program product 40 may be, or be part of, a separate, e.g. mobile, storage means, such as a computer readable disc, e.g. CD or DVD or hard disc/drive, or a solid state storage medium, e.g. a RAM or Flash memory.

FIG. 5 is a schematic flow chart of some embodiments of a method performed in the network server 3 of a service provider providing a service comprising media streaming.

The server 3 receives S1 a detection message from a mobile radio device 1 running the service for a user registered with the service provider, said message comprising an indication that said radio device has detected a radio transmitter 2 as well as comprising an identifier of said radio transmitter. The detection message may also comprise an indication of the distance between the radio device 1 and the radio transmitter 2, e.g. information about the reception strength of the transmissions from the radio transmitter 2 at the radio device 1. That the user is registered implies that the service provider knows the user and has some information about him/her e.g. gender, age, nationality, address, habits in using the service and/or payment history. The identifier may be any identifier enabling the service provider to determine whether the transmitter 2 is registered with the service provider, and if so, with which action(s) it is associated, typically an ID code.

Then, the server 3 determines S2 that the radio transmitter 2, as identified by the received S1 identifier, is registered with the service provider and associated with one or more actions (e.g. advertisement or playlist as discussed herein). In some embodiments, the determining S2 also comprises obtaining geographical coordinates which are associated with the registered radio transmitter 2. The geographical coordinates may e.g. be registered together with the transmitter identifier in the e.g. the network server 3 or other server of the service provider, or may be received from the radio transmitter 2 or the radio device 1.

Then, the server 3 elects S3 an action from the one or more actions. As discussed above the electing S3 may e.g. be based on any of: location of the radio device 1, location of the radio transmitter 2, distance between the radio device and the radio transmitter, the currently playing media stream for the media playing device 9, time of day, day of week, and/or gender, age, nationality, address, habits in using the service and/or payment history of the registered user.

Then, the server 3 sends S4 an instructions message to the radio device 1, said message comprising instructions to modify the service such that the radio device performs the elected S3 action.

Optionally, in some embodiments, the server 3, prior to receiving S1 the detection message, instructs S5 the mobile radio device 1 to search for radio transmitter(s) within a specified geographical area. Thus, the detection message indicates that the detected radio transmitter 2 has been detected within said specified geographical area. To save battery life of the radio device 1, the server 3 may instruct the radio device to only search for a radio transmitter 2 in an area where the server 3 knows that there is a radio transmitter 2 which is registered with the service provider.

FIG. 6 is a schematic flow chart of some embodiments of a method performed in the radio device 1 running a service comprising media streaming provided by the service provider. The radio device 1 is typically the same radio device as referred to above in respect of FIG. 5, why the discussion in respect of FIG. 5 is in applicable parts also relevant to FIG. 6.

The radio device 1 detects S11 a radio transmitter 2, comprising obtaining an identifier of said radio transmitter. In some embodiments, the detecting S11 comprises detecting the radio transmitter 2 within a specified geographical area in which the radio device 1 is instructed (e.g. by the service provider) to search for radio transmitter(s).

Then, the radio device 1 automatically sends S12 the detection message over a radio interface to a network server 3 of the service provider, said message comprising an indication that the radio device 1 has detected the radio transmitter 2 as well as comprising the identifier of said radio transmitter. The detection message may also comprise other information, e.g. the geographical location (e.g. GPS coordinates) of the radio device 1 and/or the geographical location of the radio transmitter 2 (e.g. if the radio transmitter 2 transmits its location/coordinates) and/or reception strength of the transmissions from the transmitter 2 (which may be used to determine the distance between the radio device 1 and the transmitter 2). That the message is sent automatically implies that it does not require an action of the user to be sent. Typically, the application software of the service run by the radio device also includes the instructions to send S12 the detection message.

Then, the radio device 1 receives S13 the instructions message from the network server 3, said message comprising instructions to modify the service to perform an action elected by the server.

Then, the radio device 1 modifies S14 the service in accordance with the received S13 instructions such that the radio device 1 performs the elected action. The instructions to modify the service may e.g. comprise instructions to stream media associated with the elected action, e.g. advertisement or media of a playlist as discussed herein.

Optionally, in some embodiments, the radio device 1 may, prior to detecting S11 the radio transmitter 2, receive S15 instructions from the network server 3 to search for radio transmitter(s) within a specified geographical area, thus saving battery life as previously discussed.

The present disclosure has mainly been described above with reference to a few embodiments. However, as is readily appreciated by a person skilled in the art, other embodiments than the ones disclosed above are equally possible within the scope of the present disclosure, as defined by the appended claims.

What is claimed is:

1. A method performed in a network server of a service provider providing a service comprising media streaming, the method comprising:
   registering, by the service provider, a plurality of radio transmitters located in a geographic area;
   instructing a mobile radio device to search for radio transmitter(s) within a specified geographical area;
   after instructing the mobile radio device to search for radio transmitter(s) within the specified geographical area, receiving a detection message from the mobile radio device running the service for a user registered with the service provider, said detection message received while the mobile radio device is streaming a first media content item, said detection message comprising an indication that said mobile radio device has detected a radio transmitter of the plurality of radio transmitters, wherein the detection message indicates that the detected radio transmitter has been detected within said specified geographical area;
   obtaining a location information associated with the radio transmitter;
   determining a user identification associated with the user of the service and the mobile radio device;
   electing a second media content item to provide to the mobile radio device based on a location of the mobile radio device and the user identification associated with the user of the service and the mobile radio device; and
   sending an instructions message to the mobile radio device, said instructions message comprising instructions to cause the mobile radio device to cease playback of the first media content item streaming from the service provider and begin playback of the second media content item.

2. The method of claim 1, wherein the determining also comprises obtaining geographical coordinates which are associated with the detected radio transmitter.

3. The method of claim 1, wherein the electing is based on any of: a location of the detected radio transmitter, a distance between the mobile radio device and the detected radio transmitter, the first media content item, a time of day, a day of week, and/or a gender, an age, a nationality, an address, habits in using the service and/or a payment history of the registered user.

4. A method performed in a mobile radio device running a service comprising media streaming provided by a service provider, the method comprising:
   receiving instructions from a network server to search for radio transmitter(s) within a specified geographical area;
   after receiving the instructions from the network server to search for radio transmitter(s) within the specified geographical area, detecting a radio transmitter, comprising obtaining an identifier of said radio transmitter wherein the detecting comprises detecting the radio transmitter within the specified geographical area in which the radio device is instructed to search for radio transmitter(s);
   automatically sending a detection message over a radio interface to the network server of the service provider, while the mobile radio device is streaming a first media content item, said detection message comprising an indication that the mobile radio device has detected the radio transmitter;
   receiving an instructions message from the network server, said instructions message comprising instructions to cause the mobile radio device to cease playback of the first media content item streaming from the service provider and begin playback of a second media content item, the second media content item elected by the network server based on a location of the mobile radio device, and a user identification associated with a user of the service and the mobile radio device; and
   streaming the elected second media content item.

5. The method of claim 4, wherein the second media content item is a pre-prepared playlist.

6. The method of claim 4, wherein the detection message also comprises an indication of the distance between the mobile radio device and the radio transmitter.

7. The method of claim 4, wherein the mobile radio device is running the service using dedicated application software, which software is configured for automatically reporting any detection of the radio transmitter to the network server.

8. The method of claim 4, wherein the radio transmitter is a Bluetooth Low Energy beacon.

9. A network server for a service provider providing a service comprising media streaming, the network server comprising:
   processor circuitry; and
   a storage unit storing instructions executable by said processor circuitry whereby said network server is operative to:
   instruct a mobile radio device to search for radio transmitter(s) within a specified geographical area;
   after instructing the mobile radio device to search for radio transmitter(s) within the specified geographical area, receive a detection message from the mobile radio device running the service, said detection message received while the mobile radio device is streaming a first media content item, said detection message comprising an indication that said mobile radio device has detected a radio transmitter, wherein the detection message indicates that the detected radio transmitter has been detected within said specified geographical area;
   elect a second media content item to provide to the mobile radio device based on a location of the mobile radio device and a user identification associated with a user of the service and the mobile radio device; and
   send an instructions message to the mobile radio device, said instructions message comprising instructions to cause the mobile radio device to cease playback of the first media content item streaming from the service provider and begin playback of the second media content item.

10. A mobile radio device configured for running a service comprising media streaming provided by a service provider, the mobile radio device comprising:
    processor circuitry; and
    a storage unit storing instructions executable by said processor circuitry whereby said mobile radio device is operative to:
    receive instructions from a network server to search for radio transmitter(s) within a specified geographical area;
    after receiving the instructions from the network server to search for radio transmitter(s) within the specified geographical area, detect a radio transmitter, comprising obtaining an identifier of said radio transmitter, wherein the detecting comprises detecting the radio transmitter within the specified geographical area in which the mobile radio device is instructed to search for radio transmitter(s);

automatically send a detection message over a radio interface to the network server of the service provider, while the mobile radio device is streaming a first media content item, said detection message comprising an indication that the mobile radio device has detected the radio transmitter;

receive an instructions message from the network server, said instructions message comprising instructions to cause the mobile radio device to cease playback of the first media content item streaming from the service provider and begin playback of a second media content item, the second media content item elected by the network server based on a location of the mobile radio device, and a user identification associated with a user of the service and the mobile radio device; and stream the elected second media content item.

11. The method of claim 1, wherein the second media content item is an advertisement.

12. The method of claim 1, wherein the second media content item is a playlist.

13. The method of claim 4, wherein the second media content item is an advertisement.

14. The network server of claim 9, wherein the second media content item is an advertisement.

15. The network server of claim 9, wherein the second media content item is a playlist.

16. The mobile radio device of claim 10, wherein the second media content item is an advertisement.

\* \* \* \* \*